US012760807B2

(12) United States Patent
Cho

(10) Patent No.: US 12,760,807 B2
(45) Date of Patent: Oct. 13, 2026

(54) VALVE MODULE FOR VACUUM PUMP

(71) Applicant: VTEC CO., LTD., Busan (KR)

(72) Inventor: Ho-Young Cho, Seoul (KR)

(73) Assignee: VTEC CO., LTD., Busan (KR)

( * ) Notice: Subject to any disclaimer, the term of this patent is extended or adjusted under 35 U.S.C. 154(b) by 0 days.

(21) Appl. No.: 19/268,672

(22) Filed: Jul. 14, 2025

(65) Prior Publication Data

US 2026/0049665 A1 Feb. 19, 2026

(30) Foreign Application Priority Data

Aug. 13, 2024 (KR) ........................ 10-2024-0108275

(51) Int. Cl.
*F16K 15/02* (2006.01)
*F16K 51/02* (2006.01)

(52) U.S. Cl.
CPC ............ *F16K 15/026* (2013.01); *F16K 51/02* (2013.01)

(58) Field of Classification Search
CPC ............................... F16K 15/026; F16K 51/02
See application file for complete search history.

(56) References Cited

U.S. PATENT DOCUMENTS

| | | | | |
|---|---|---|---|---|
| 4,712,818 | A | 12/1987 | Borgman et al. | |
| 7,000,964 | B1 | 2/2006 | Porras et al. | |
| 7,017,961 | B1 | 3/2006 | Parnell et al. | |
| 7,296,594 | B1 * | 11/2007 | Phanco | F16K 15/025 137/512.2 |
| 7,648,182 | B2 | 1/2010 | Salimkhan | |
| 7,950,708 | B2 | 5/2011 | Parnell | |
| 8,684,434 | B2 | 4/2014 | Lomerson, Jr. et al. | |
| 9,669,554 | B2 | 6/2017 | Eisele | |
| 11,331,813 | B2 | 5/2022 | Billon et al. | |
| 2009/0273199 | A1 | 11/2009 | Joguet et al. | |
| 2021/0231224 | A1 * | 7/2021 | Sugino | F16K 15/026 |

FOREIGN PATENT DOCUMENTS

| | | | |
|---|---|---|---|
| JP | 2002137183 | A | 5/2002 |
| KR | 100793323 | B1 | 1/2008 |
| KR | 102570475 | B1 | 8/2023 |
| KR | 102616159 | B1 | 12/2023 |
| KR | 102652932 | B1 | 3/2024 |

* cited by examiner

*Primary Examiner* — P. Macade Nichols
(74) *Attorney, Agent, or Firm* — INNOVATION CAPITAL LAW GROUP, LLP; Vic Lin

(57) ABSTRACT

The present invention relates to a valve module for a vacuum pump, and the valve module includes a through-body mounted on a communication-hole of the vacuum pump, and a valve disposed in the body to open and close a central passage while moving upward/downward. In the present invention, particularly, an exhaust path of the pad includes one or more longitudinal air guide-grooves, which are defined in an inner wall or an outer wall and are disposed between the inner wall of the space part and the outer wall of the valve to serve as an air passage connected to the passage, and a gap or micro-hole defined between the valve and the body to communicate with the guide-groove and the central passage. Therefore, there is no concern that the passage is blocked or deformed even though the body is made of an elastically deformable material.

5 Claims, 6 Drawing Sheets

VALVE MODULE FOR VACUUM PUMP

TECHNICAL FIELD

The present invention relates to a valve for controlling a flow of air, and more particularly, to a valve module coupled to and used in a vacuum pump.

BACKGROUND ART

Typically, a vacuum pump includes a hollow chamber and an air ejector that is provided in the chamber through hose connection or internal mounting, and an adsorption pad is connected through a communication-hole defined in one surface of the chamber.

In brief description, when compressed air passes through the ejector at a high speed in a state in which the pad is in contact with a surface of an object, internal air of the pad is induced into the ejector through the communication-hole and the chamber and then is discharged to the outside together with the compressed air. In this process, a vacuum and negative pressure are generated inside the pad, and the object is adsorbed onto the pad by the negative pressure.

The adsorbed object will be transferred to a designated position by an automated or robotic system.

In the above, if a diameter of the communication-hole is too large, a vacuum reaching level of the device is low, and conversely, if the diameter of the communication-hole is too small, the vacuum reaching speed is slow. Thus, an appropriate valve element is required to be provided in the communication-hole. In fact, flexible valves, up/down plate valves, and ball valves are used as the valve.

FIG. 1 illustrates an example of a valve assembly disclosed in Patent Publication No. 10-2570475 as the plate valve. Here, a vacuum pump 110 includes a hollow chamber and a so-called air ejector 112 disposed inside or outside the chamber, and a valve assembly 100 is mounted through a communication-hole 113 defined in the chamber plate 111. The valve assembly 100 specifically includes a vertical through-body 101 that is fixedly fitted into a communication-hole 113 and a valve 102 arranged to be able to movable vertically inside the body and further includes a micro-hole 103 defined at an appropriate position of the valve 102.

This structure is configured to exhaust an adsorption pad 120 connected to communicate with a lower portion of the body 101 when the compressed air passes through the air ejector 112 at a high speed and is discharged. A reference symbol 'W' indicates an adsorption object.

Referring to the drawing, initially, the valve 102 is in a 'DOWN' position, and a central passage 104 of the body 101 is opened, and thus, a large amount of air is exhausted instantaneously at an 'initial' operation, and as the valve 102 moves to an 'UP' position due to an air pressure to perform the exhaust only through the micro-hole 103. In this manner, the valve assembly 100 functions to simultaneously improve a vacuum reaching speed and a level of the device.

In this structure, for the 'initial' exhaust, the body 101 has to maintain a path 105 at a certain interval corresponding to a side surface of the valve 102 on an inner wall thereof. Thus, the body 101 is, in principle, made of hard plastic or a metal that has no risk of deformation. However, in this case, a design and manufacturing of the body 101 and the valve assembly 100 are complicated, and there is a problem that contact and airtight assembly and mounting to the communication-hole 113 are difficult.

In fact, it is seen that this problem is partially solved by forming a portion corresponding to the body 101 with an elastically deformable material such as an elastomer, as in the valve structure disclosed in, for example, U.S. Pat. No. 11,331,813. However, in this case, it is true that there is a risk that the pass 105 is significantly reduced or even blocked due to deformability of the body 101. Alternatively, this may vary depending on a degree of the deformability.

As a countermeasure, a separate rigid support structure may be added to the inner wall of the body 101, but in this case, productivity is significantly reduced.

PRIOR ART DOCUMENT

Korean Patent Registration No. 10-0793323
Korean Patent Registration No. 10-2652932
Korean Patent Registration No. 10-2570475
Korean Patent Registration No. 10-2616159
U.S. Pat. No. 11,331,813

DISCLOSURE OF THE INVENTION

Technical Problem

The present invention has been proposed to solve the above problems according to the related art. An object of the present invention is to provide a valve module for a vacuum pump which is easy to be manufactured and mounted and has free suction/exhaust operations by configuring a body portion with an elastic material and specially designing an exhaust path.

Technical Solution

A valve module of the present invention includes a through-body mounted on a communication-hole of a pad of a vacuum pump, and a valve disposed in the body to open and close a central passage, wherein the body is made of an elastically deformable material and comprises an annular mounting-groove defined along an outer circumferential surface thereof, and an expandable space part defined in a portion of the passage to enable the valve to be movable within a certain range, the valve is an up/down valve configured to open and close the passage of the body while moving vertically within the range of the space part by an exhaust pressure, and the exhaust pass of the pad includes:

one or more longitudinal air guide-grooves, which are defined in an inner wall or an outer wall and are disposed between the inner wall of the space part and the outer wall of the valve to serve as an air passage connected to the passage; and a gap or micro-hole defined between the valve and the body to communicate with the guide-groove and the central passage.

Preferably, a material of the body (11) is elastomer or synthetic rubber. However, a material of the valve is plastic.

Preferably, the body includes a circular 'V'-groove defined at a depth from a top surface for convenience of mounting to the communication-hole. In addition, the mounting-groove is configured so that an inlet has a narrow with compared to an inner bottom of the groove to reinforce airtightness of the mounting for the communication-hole.

Advantageous Effects

The valve module according to the present invention may have the effect of being easy to be manufactured and mounted because the body mounted on the communication-hole is made of the elastically deformable material, and in particular, the exhaust path is safely and firmly maintained by the configuration of the guide-groove in spite of the arbitrary deformation due to the material properties of the body.

MODE FOR CARRYING OUT THE INVENTION

Figure 1:
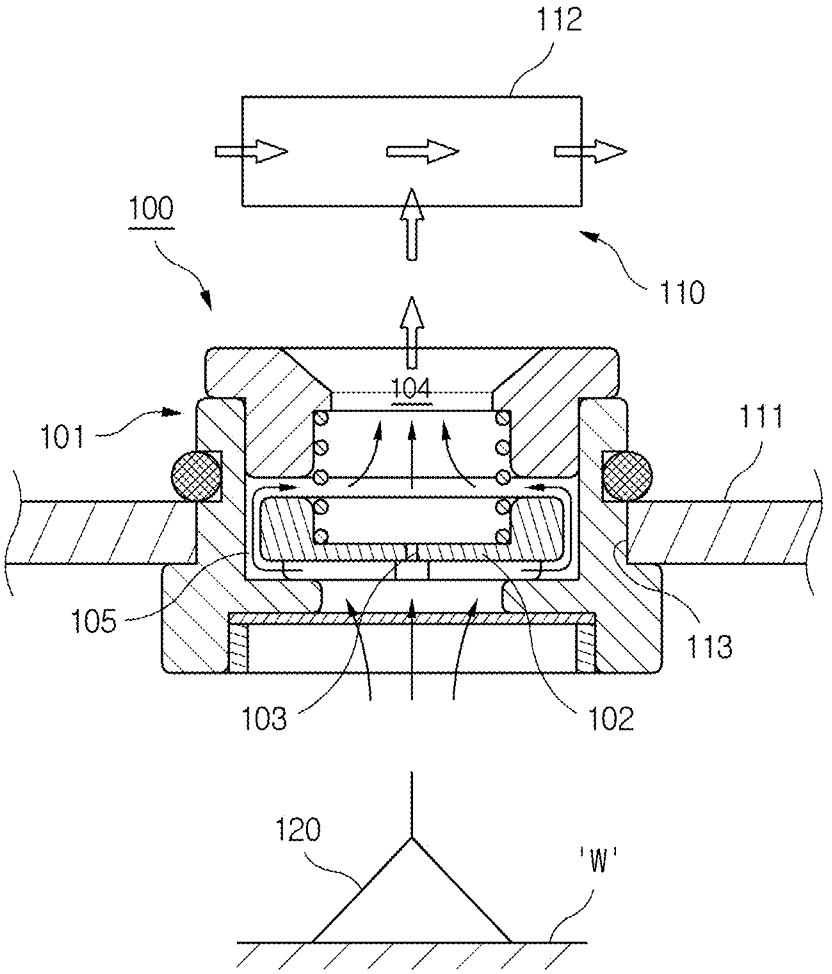
FIG. 1 is a view illustrating a configuration of a plate valve according to the related art.
Figure 2:
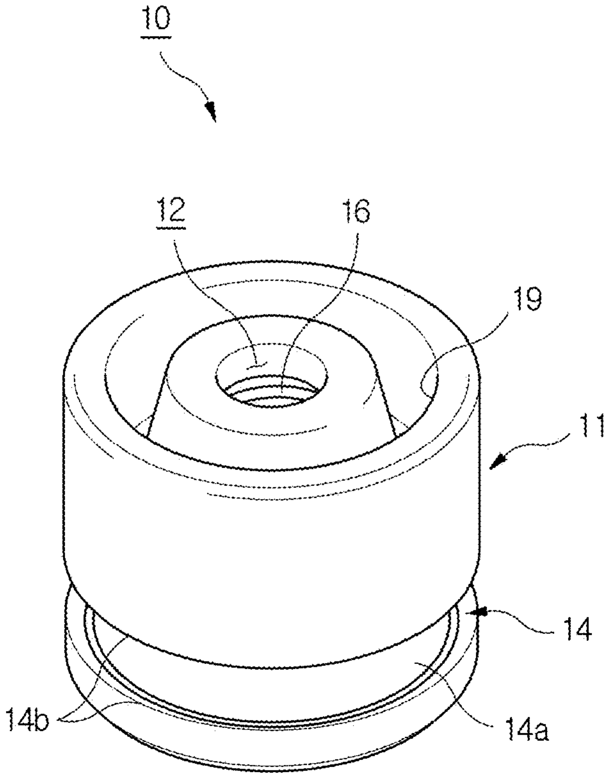
FIG. 2 is a perspective view of a valve module according to the present invention.
Figure 3:
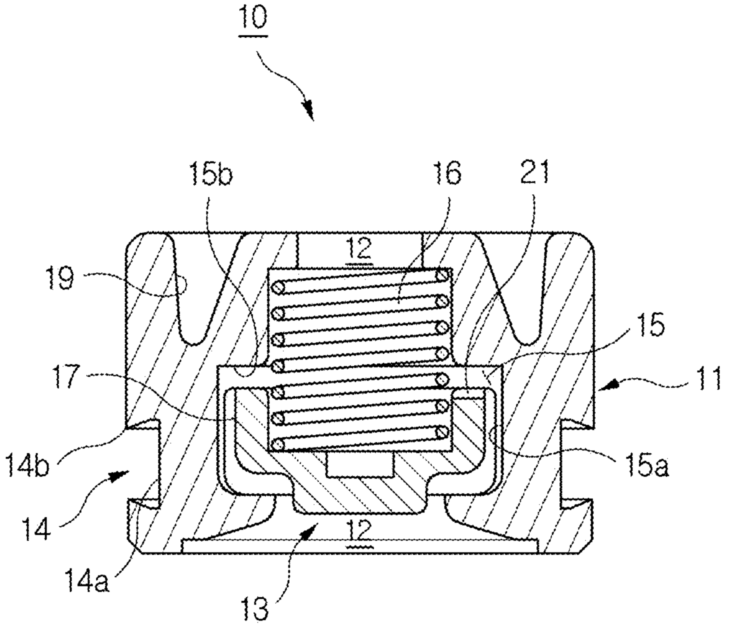
FIG. 3 is a cross-sectional view of FIG. 2.
Figure 4:
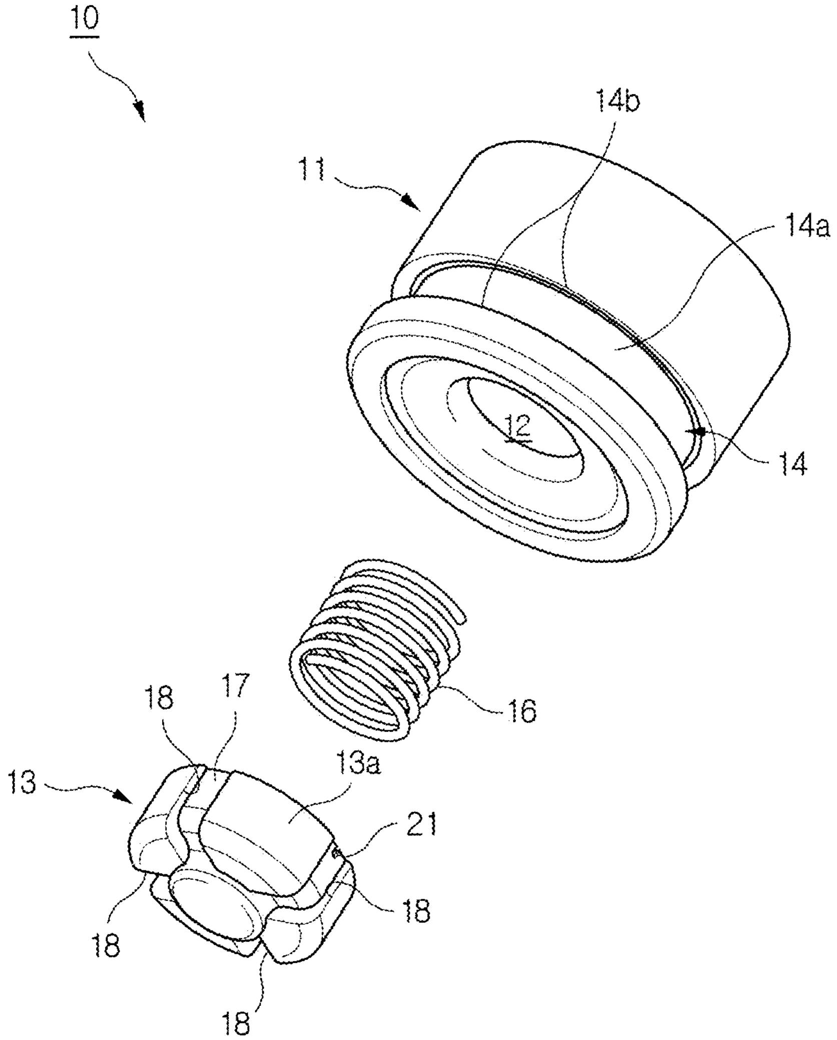
FIG. 4 is an exploded perspective view of FIG. 2.
Figure 5:
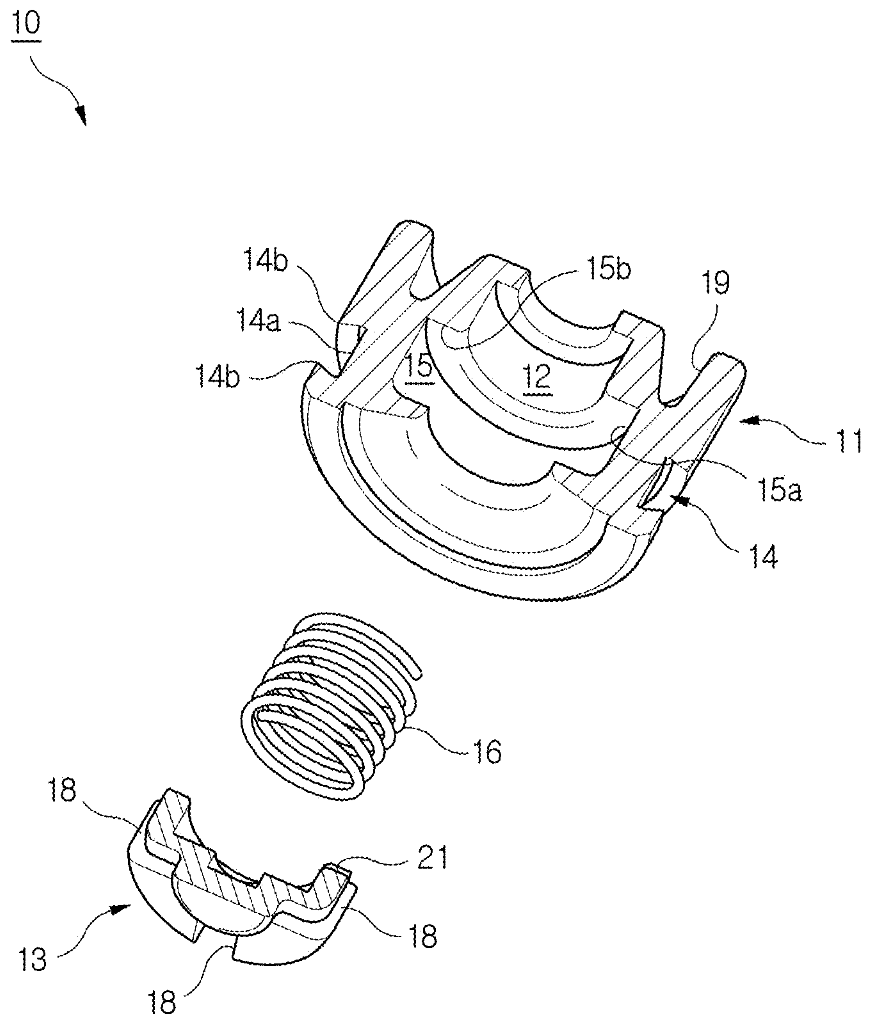
FIG. 5 is an exploded perspective view of a cross-section of FIG. 2.

The features and operational effects of a 'valve module for a vacuum pump' (hereinafter, referred to as a 'valve module') of the present invention, which are described or not described above, will become more apparent through the description of preferred embodiments described below with reference to the attached drawings. In FIG. 2 and below, a valve module of the present invention is indicated by reference numeral '10'.

Referring to FIGS. 2 to 6, the valve module 10 of the present invention basically includes a through-body 11 mounted on a pad communication-hole 113 of a vacuum pump, and a valve 13 disposed within the body 11 to open and close a central passage 12 of the body 11. In general, the vacuum pump includes a hollow chamber and a so-called air ejector disposed inside or outside the chamber, and a valve module 10 is mounted through a communication-hole 113 defined in one side plate 111 of the chamber (see FIG. 6)

Specifically, the body 11 is integrally provided using an elastically deformable material and include an annular mounting-groove 14 defined along an outer circumferential surface thereof, and an expandable space part 15 defined in a portion of the passage 12 to enable the valve 13 to move within a certain range. The material of the body 11 is preferably elastomer or synthetic rubber.

The valve 13 is an up/down valve that is installed within the space part 15 to open and close the central passage 12 of the body 11 while moving vertically within its space range, and is preferably molded using a plastic material. Since the body 11 is made of the elastically deformable material, when assembling the valve module 10, the valve 13 may be installed inside the space part 15 without any particular difficulty.

In this embodiment, the valve 13 is configured as a plate-type valve, but in another example, the valve 13 may be a ball valve or another-type valve. The symbol 16 is a spring that is disposed in the passage 12 to elastically support movement of the valve 13, and here, the valve 13 has a shape in which a top surface is recessed so that one end of the spring 16 is inserted. However, this spring support structure is not special in the present invention.

Reference numeral 120 illustrates an adsorption pad (see FIG. 6) requiring exhaust. The exhaust path 17 of the pad 120 includes one or more longitudinal air guide-grooves 18, which are defined in the inner wall 15*a* or the outer wall 13*a* and are disposed between an inner wall 15*a* of the space part 15 and an outer wall 13*a* of the valve 13 to serve as an air passage connected to the central passage 12.

The body 11 may undergo arbitrary deformation due to a physical pressure during the mounting or an air pressure during the operation due to its material properties. Thus, it is important to have a means for preventing the pass 17 from being reduced or blocked by the deformation, and in the present invention, as a result, the pass 17 may be maintained safely and firmly by the guide-grooves 18.

In this embodiment, each of the guide-grooves 18 is defined in the outer wall 13*a* of the valve 13. This structure is considered to be more firmed compared to a case in which the guide-groove 18 is defined in the inner wall 15*a* of the space part 15. Here, the guide-groove 18 extends from the bottom of the valve 13, but an upward extension range of the guide-groove 18 is not considered.

Figure 6:
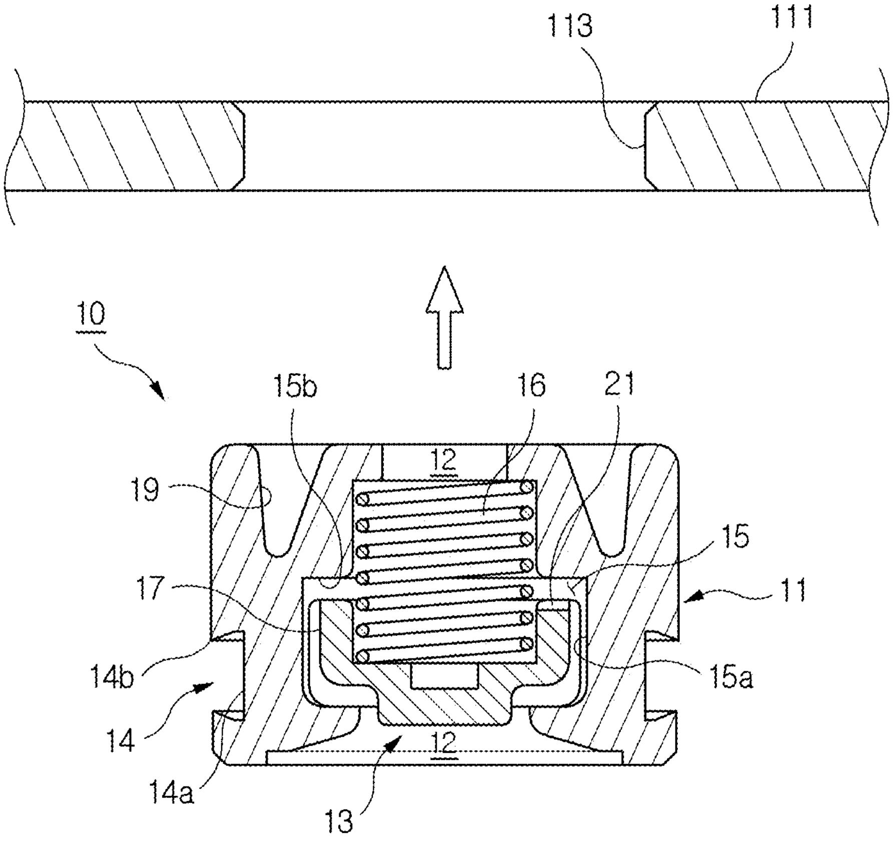
FIG. 6 is a view for explaining mounting of the valve module according to the present invention.

Referring to FIG. 6, the valve module 10 is strongly mounted by fitting the body 11 into the communication-hole 113 defined in the chamber plate 111 and allowing a mounting-groove 14 to correspond thereto. The pad 120 requiring the exhaust will be connected to a lower portion of the valve module 10. The body 11 will not be difficult to be mounted due to the elastic deformation properties of the material. However, in order to facilitate the 'initial' insertion into the communication-hole 113, in this embodiment, an annular 'V'-groove 19 may be defined at a predetermined depth in the top surface of the body 11 to reliably reinforce contractility and expandability of an end.

As described above, the body 11 may be physically deformed by the pressure applied when being coupled to the communication-hole 113. This deformation also has a negative effect on the shape of the exhaust pass 17, but does not interfere with the pass 17 from functioning as the exhaust path at all as the vertical guide-groove 18 described above remains undiminished.

When mounting the body 11, particularly, reliable sealing is required between the mounting-groove 14 and the communication-hole 113. Thus, in this embodiment, the mounting-groove 14 is configured so that a width of an inlet 14*b* is narrower than an inner bottom 14*a* of the mounting-groove 14 to reinforce airtightness of the mounting. Thus, when the assembling/mounting, an elastic pressure may be applied to a surface of the plate 111 at the inlet 14*b*, and as a result, the airtightness between the mounting-groove 14 and the communication-hole 113 may be ensured.

Preferably, the pass 17 is configured to further include a gap or micro-hole 20 defined between the valve 13 and the body 11 to communicate with the guide-groove 18 and the central passage 12. Here, the gap means a gap between a top surface of the ascending valve 13 and an upper-protrusion 15*b* of the space part 15 of the body 11. In this embodiment, the micro-hole 20 is variably configured as an air-slot 21 defined in an upper end surface of the valve 13 is in contact with/separated from the upper-protrusion 15*b* of the space part 15 (see (a) and (b) of FIG. 7). This structure considers possibility that the gap or the micro-hole 20 is blocked when the ascending valve 13 is in close contact with the upper-protrusion 15*b* of the body 11. However, it may vary depending on the design.

Even if the valve 13 perform an 'UP' operation, and thus, direct communication between the pass 17 and the passage 12 is closed, micro-exhaust through the micro-hole 20 continues.

Figure 7:
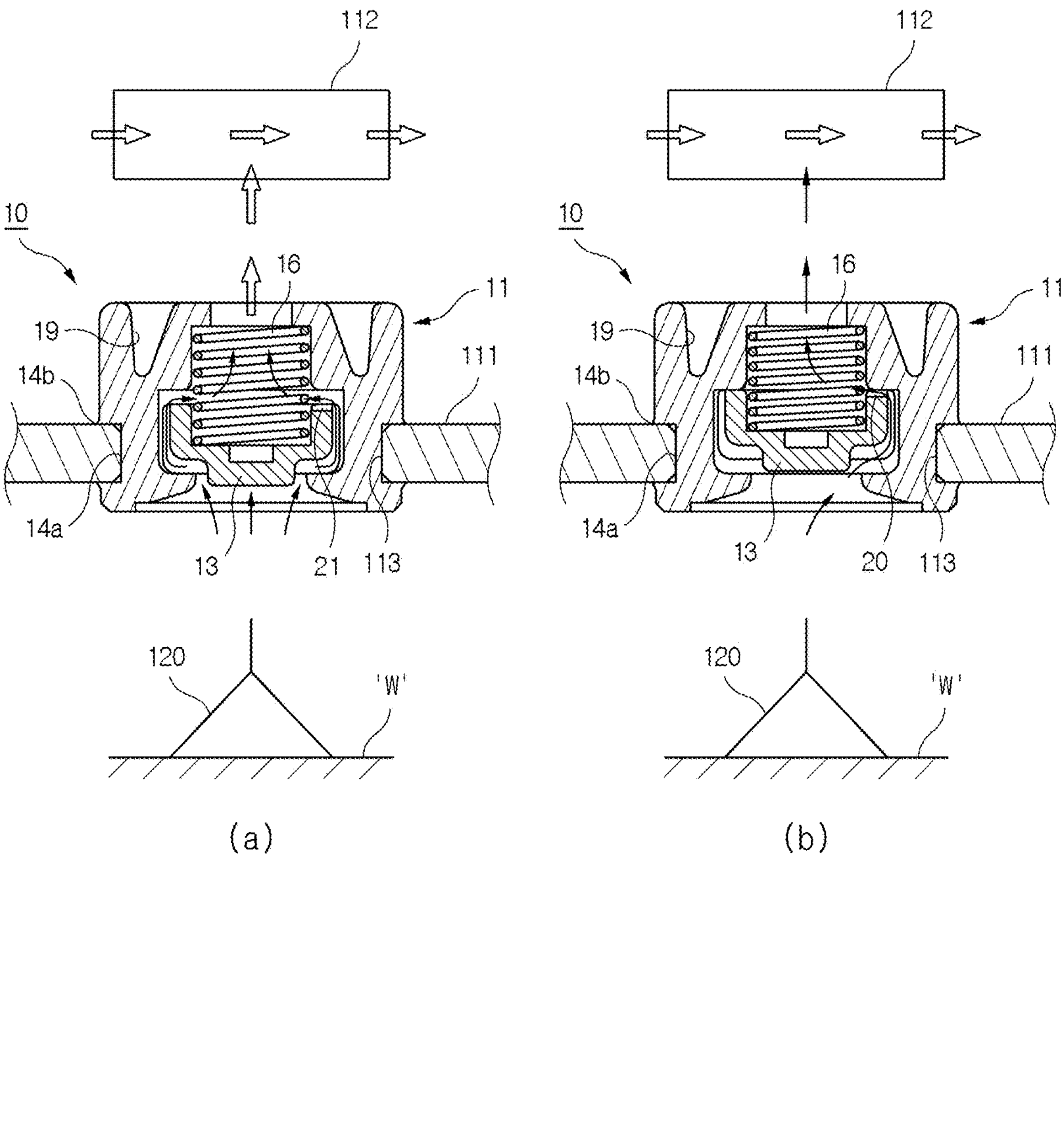
FIG. 7 is a view for explaining an operation of the valve module of FIG. 6.

Referring to FIG. 7, the valve module 10 is mounted to be fitted into the communication-hole 113 defined in a chamber plate 111. In this state, when the compressed air passes through the air ejector 112 at a high speed, internal air of the pad 120 passes through the valve module 10, induced into the ejector 112 via the chamber, and is discharged to the outside together with the compressed air. During this exhaust process, a vacuum and negative pressure for gripping the object W are generated inside the pad 120.

First, in a stationary state such as (a) of FIG. 7, since the valve 13 is seated on the bottom surface of the space part 15, the internal air of the pad 120 in the 'initial' exhaust may pass through the guide-groove 18 of the pass 17 in a longitudinal direction and then be directly introduced into the central passage 12. Therefore, in the 'initial' exhaust, a large amount of air inside the pad 120 may be quickly discharged.

The valve 13 gradually ascends due to the air pressure so that its top surface is in contact with the upper-protrusion 15*b* of the space part 15. (b) of FIG. 7 illustrates the above-described state, and in this case, the direct communication between the pass 17 and the central passage 12 is closed, and until now, the micro-exhaust through the micro-hole 20 continues to proceed. This allows the vacuum level to increase and be maintained, and countermeasures may be taken against any vacuum leaks that may occur.

Referring to (a) and (b) of FIG. 7 in sequence, the vacuum reaching speed and the vacuum level may be satisfied by using the valve module 10 of the present invention.

As described above, the valve module 10 according to the present invention is easy to be manufactured and mounted because the body 11 mounted on the communication-hole 113 is made of the elastically deformable material, and in particular, in spite of the arbitrary deformation of the body 11, the exhaust path 17 may be safely and firmly maintained by the configuration of the guide-groove 18.

Functionally, the vacuum reaching speed and the vacuum level may be satisfied by using the valve module 10 of the present invention.

DESCRIPTION OF THE SYMBOLS

| | | | |
|---|---|---|---|
| 10. | Valve module | | |
| 11. | Body | | |
| 12. | Passage | | |
| 13. | Valve | 13a. | Outer wall |
| 14. | Mounting-groove | | |
| 14a. | Bottom | 14b. | Inlet |
| 15. | Space part | | |
| 15a. | Inner wall | 15b. | Upper-protrusion |
| 16. | Spring | | |

-continued

| | |
|---|---|
| 17. | Pass |
| 18. | Guide-groove |
| 19. | V-groove |
| 20. | Micro-groove |
| 21. | Air-slot |
| 111. | Plate |
| 112. | Ejector |
| 113. | Communication-hole |
| 120. | Pad |

The invention claimed is:

1. A valve module comprising a through-body (11) mounted on a communication-hole (113) of a pad (120) of a vacuum pump, and a valve (13) disposed in the body (11) to open and close a central passage (12), wherein the body (11) is made of an elastically deformable material and comprises an annular mounting-groove (14) defined along an outer circumferential surface thereof, and an expandable space part (15) defined in a portion of the passage (12) to enable the valve (13) to be movable within a certain range, the valve (13) is an up/down valve configured to open and close the passage (12) of the body (11) while moving vertically within the range of the space part (15) by an exhaust pressure, and the exhaust pass (17) of the pad (120) comprises:

one or more longitudinal air guide-grooves (18), which are defined in an inner wall (15*a*) or an outer wall (13*a*) and are disposed between the inner wall (15*a*) of the space part (15) and the outer wall (13*a*) of the valve (13) to serve as an air passage connected to the passage (12); and a gap or micro-hole (20) defined between the valve (13) and the body (11) to communicate with the guide-groove (18) and the central passage (12).

2. The valve module of claim 1, wherein a material of the body (11) is elastomer or synthetic rubber.

3. The valve module of claim 1, wherein the body (11) comprises a circular 'V'-groove (19) defined at a depth from a top surface for convenience of mounting to the communication-hole (113).

4. The valve module of claim 1, wherein the mounting-groove (14) is configured so that an inlet (14*b*) has a narrow with compared to an inner bottom (14*a*) of the groove to reinforce airtightness of the mounting for the communication-hole (113).

5. The valve module of claim 1, wherein the micro-hole (20) is variably configured as an air-slot (21) defined in an upper end surface of the valve (13) is in contact with or separated from an upper-protrusion (15*b*) of the space (15).

* * * * *